(12) United States Patent
Feng et al.

(10) Patent No.: US 11,757,786 B2
(45) Date of Patent: Sep. 12, 2023

(54) METHOD, SYSTEM, STORAGE MEDIUM AND APPLICATION FOR JOINT OPTIMIZATION OF RESOURCE ALLOCATION

(71) Applicants: Xidian University, Xi'an (CN); Xi'an Xidian Blockchain Technology CO., Ltd., Xi'an (CN)

(72) Inventors: Jie Feng, Xi'an (CN); Qingqi Pei, Xi'an (CN); Peixin Yue, Xi'an (CN)

(73) Assignees: XIDIAN UNIVERSITY, Xi'an (CN); XI'AN XIDIAN BLOCKCHAIN TECHNOLOGY CO., LTD., Xi'an (CN)

( * ) Notice: Subject to any disclaimer, the term of this patent is extended or adjusted under 35 U.S.C. 154(b) by 223 days.

(21) Appl. No.: 17/338,718

(22) Filed: Jun. 4, 2021

(65) Prior Publication Data
US 2022/0231960 A1 Jul. 21, 2022

(30) Foreign Application Priority Data
Jan. 12, 2021 (CN) .......................... 202110038665.1

(51) Int. Cl.
*H04L 12/873* (2013.01)
*H04L 47/52* (2022.01)
(Continued)

(52) U.S. Cl.
CPC .......... *H04L 47/522* (2013.01); *H04L 5/0098* (2013.01); *H04N 21/647* (2013.01); *H04W 72/0453* (2013.01)

(58) Field of Classification Search
CPC .......................... H04L 5/0098; H04W 72/0453
(Continued)

(56) References Cited

U.S. PATENT DOCUMENTS

2005/0089035 A1\* 4/2005 Klemets ........... H04N 21/44004
370/390
2012/0314127 A1\* 12/2012 Syed ....................... H04L 47/20
348/E7.045
(Continued)

OTHER PUBLICATIONS

Yuan Wu, et al., Delay-Minimization Nonorthogonal Multiple Access Enabled Multi-User Mobile Edge Computation Offloading, IEEE Journal of Selected Topics in Signal Processing, 2019, pp. 392-407, vol. 13 No. 3.
(Continued)

*Primary Examiner* — Christopher M Crutchfield
*Assistant Examiner* — Jean F Voltaire
(74) *Attorney, Agent, or Firm* — Bayramoglu Law Offices LLC (57) ABSTRACT

A method for joint optimization of resource allocation includes: obtaining network data volumes of two services; obtaining queue statuses at a time t; computing sub-channel slices; computing a local CPU speed scaling, a user association, a sub-carrier assignment, and a power allocation of service 1; computing a user association, a video quality decision, and a sub-carrier assignment of service 2; obtaining an initial sub-carrier assignment and an initial power allocation; obtaining the user association; obtaining the power allocation and the sub-carrier assignment of service 1; obtaining the video quality decision; obtaining the sub-carrier assignment of service 2; obtaining an optimal data transmission rate and the user association to obtain a data rate allocation; and obtaining an optimal CPU speed scaling, an optimal user association, an optimal sub-carrier assignment, an optimal power allocation, an optimal video quality decision and an optimal sub-channel allocation.

17 Claims, 7 Drawing Sheets

(51) Int. Cl.
*H04L 5/00* (2006.01)
*H04N 21/647* (2011.01)
*H04W 72/0453* (2023.01)

(58) Field of Classification Search
USPC .......................................... 370/224; 709/224
See application file for complete search history.

(56) References Cited

U.S. PATENT DOCUMENTS

| | | | | |
|---|---|---|---|---|
| 2014/0317241 | A1* | 10/2014 | Zhao | H04L 65/756 |
| | | | | 709/219 |
| 2014/0368672 | A1* | 12/2014 | Ralston | H04N 1/00244 |
| | | | | 348/207.1 |
| 2015/0324215 | A1* | 11/2015 | Borthakur | G06F 9/45558 |
| | | | | 718/1 |

OTHER PUBLICATIONS

Thinh Quang Dinh, et al., Learning for Computation Offloading in Mobile Edge Computing, IEEE Transactions on Communications, 2018, pp. 6353-6367, vol. 66 No. 12.

Jia Luo, et al., Adaptive Video Streaming With Edge Caching and Video Transcoding Over Software-Defined Mobile Networks: A Deep Reinforcement Learning Approach, IEEE Transactions on Wireless Communications, 2020, pp. 1577-1592, vol. 19 No. 3.

Yiming Liu, et al., Decentralized Resource Allocation for Video Transcoding and Delivery in Blockchain-Based System With Mobile Edge Computing, IEEE Transactions on Vehicular Technology, 2019, pp. 11169-11185, vol. 68 No. 11.

* cited by examiner

METHOD, SYSTEM, STORAGE MEDIUM AND APPLICATION FOR JOINT OPTIMIZATION OF RESOURCE ALLOCATION

CROSS REFERENCE TO THE RELATED APPLICATIONS

This application is based upon and claims priority to Chinese Patent Application No. 202110038665.1, filed on Jan. 12, 2021, the entire contents of which are incorporated herein by reference.

TECHNICAL FIELD

The present invention pertains to the technical field of resource allocation optimization of mobile edge computing (MEC) systems, and more particularly, relates to a method, system, storage medium and application for joint optimization of resource allocation.

BACKGROUND

The past decades have witnessed a significant development of smart mobile devices and wireless communication networks, which have raised a variety of mobile applications to support more and more types of services. However, smart mobile devices have difficulty meeting the quality of service (QoS) requirements of intensive applications due to their constrained computing and storage resources. Existing mobile edge computing (MEC) can support multiple types of services, and can effectively reduce delay, diminish energy consumption, and increase data rates to support various QoS requirements.

Numerous test operations have been performed on MEC systems with various QoS requirements and several technical solutions have been proposed. For example, in order to improve computational experiences of users, in terms of computation offloading, the author of the article, titled Delay-Minimization Nonorthogonal Multiple Access Enabled Multi-User Mobile Edge Computation Offloading, uses the effective transmission of nonorthogonal multiple access and proposes a computation offloading solution based on nonorthogonal multiple access to minimize the computing delay of the entire computational task. The author of the article, titled Learning for Computation Offloading in Mobile Edge Computing, studied a multi-user and multi-server computation offloading system, which aims to maximize the number of processed central processing unit (CPU) cycles while minimizing its energy consumption. For example, some operations have been performed on the application of video streaming in MEC networks, and the key issue for video streaming is to improve its QoS. The author of the article, titled Adaptive Video Streaming with Edge Caching and Video Transcoding over Software-Defined Mobile Networks: A Deep Reinforcement Learning Approach, proposed a solution of adaptive video streaming, in which edge caching and video transcoding are considered to minimize the energy consumption of the system. The author of the article, titled Decentralized Resource Allocation for Video Transcoding and Delivery in Blockchain-based System with Mobile Edge Computing proposed a blockchain-based MEC architecture to maximize the revenue of the network. These studies have provided relatively mature theoretical solutions to the various QoS requirements of the MEC system. However, the diverse and differentiated requirements of QoS have posed more difficulties and challenges to the allocation of the radio resources and computing resources of the MEC system.

As analyzed above, the prior art has the following problems and shortcomings. Although many studies have focused on the computation offloading service and video streaming service in the MEC system, these studies are only oriented to a single service or scenario in the MEC system. The MEC system in an actual service environment, however, typically provides users with multiple different types of services simultaneously, while users' demands for the services in real time vary dynamically. In this case, prior static service types provided for users have an unsatisfactory performance when facing dynamically varied user service requirements in an actual service environment.

The difficulty of solving the above-mentioned problems and shortcomings is as follows. The solutions of the MEC systems or architectures proposed by the existing research are only oriented to a single QoS requirement. Such solutions cannot solve the problem that the system has a low performance when facing the diverse and differentiated QoS requirements in an actual service environment, and thus cannot guarantee the overall performance of the MEC system.

The significance of solving the above-mentioned problems and shortcomings is: to jointly optimize the performance indicators of multiple services to ensure the normal operation of the MEC system in an environment with diverse and differentiated QoS requirements, while maintaining the overall performance and overall cost within acceptable limits.

SUMMARY

In view of the problems identified in the prior art, the present invention provides a method, system, storage medium and application for joint optimization of resource allocation.

The present invention is achieved by providing a method for joint optimization of resource allocation. The method for joint optimization of resource allocation includes: obtaining network data volumes of two services; obtaining queue statuses at a time t, computing a local CPU speed scaling, a user association, a sub-carrier assignment, and a power allocation of service 1; computing a user association, a video quality decision, and a sub-carrier assignment of service 2; obtaining an initial sub-carrier assignment and an initial power allocation; obtaining the user association; obtaining the power allocation and the sub-carrier assignment of service 1; obtaining the video quality decision; obtaining the sub-carrier assignment of service 2; obtaining an optimal data transmission rate and the user association to obtain a data rate allocation; and obtaining an optimal CPU speed scaling, an optimal user association, an optimal sub-carrier assignment, an optimal power allocation, an optimal video quality decision, and an optimal sub-channel allocation.

Further, the method for joint optimization of resource allocation specifically includes:

step 1: obtaining the network data volumes of service 1 and service 2, and storing the network data volumes in a queue $Q_1$ and a queue $Q_2$, respectively;

step 2: obtaining a status of the queue $Q_1$ and a status of the queue $Q_2$ at the time t, respectively;

step 3: computing the sub-channel slices $N_1(t_k)$ and $N_2(t_k)$;

step 4: computing the local CPU speed scaling $f_1(t)$ and the user association $y_1(t)$ of service 1;

step 5: computing the sub-carrier assignment $p_1(t)$ and the power allocation $P_1(t)$ of service 1;

step 6: computing the user association $y_2(t)$, the video quality decision $\mu_2(t)$, and the sub-carrier assignment $p_2(t)$ of service 2;

step 7: updating the status of the queue $Q_1$ and the status of the queue $Q_2$; letting t=t+1, and if t is less than a total time, then executing step 2 again;

step 8: setting h=0 and an algorithm accuracy $\varepsilon$>0;

step 9: based on a user association $Y_0(t)=(y_1(t),y_2(t))$, a power allocation $P_1^0(t)$ and a video quality decision $\mu_2^0(t)$, assigning a sub-carrier assignment $\rho_1^0(t)$ according to step 5, and assigning a sub-carrier assignment $\rho_2^0(t)$ according to step 6;

step 10: computing $\Phi_0(N(t_k))$ based on $f_1(t)$, $P_1^0(t)$, $\mu_2^0(t)$, $\rho^0(t)$, and $Y_0(t)$;

step 11: updating h=h+1;

step 12: based on $\rho^{h-1}(t)$ and $P_1^{h-1}(t)(\mu_2^{h-1}(t))$, associating a mobile device with a user association $Y_h(t)=(y_1^h(t),y_2^h(t))$;

step 13: based on a user association $y_1^h(t)$, obtaining a power allocation $P_1^h(t)$ and a sub-carrier assignment $\rho_1^h(t)$ according to step 5;

step 14: based on $y_2^h(t)$ and $\rho_2^{h-2}(t)$, obtaining a video quality decision $\mu_2^h(t)$ according to step 6;

step 15: based on $y_2^h(t)$ and $\mu_2^{h-1}(t)$, assigning a sub-carrier assignment $\rho_2^h(t)$ according to step 6;

step 16: based on $f_1(t)$, $P_1^h(t)$, $\rho^h(t)=(\rho_1^h(t), \rho_2^h(t))$, and $Y_h(t)$, computing $\Phi_h(N(t_k))$ according to step 10, if $\Phi_h(N(t_k))-\Phi_{h-1}(N(t_k))<\varepsilon$, then obtaining the optimal CPU speed scaling, the optimal user association, the optimal sub-carrier assignment, the optimal power allocation, the optimal video quality decision, and the optimal sub-channel allocation; and if $\Phi_h(N(t_k))-\Phi_{h-1}(N(t_k))\geq\varepsilon$, executing step 12 again.

Further, the local CPU speed scaling in step 4 is expressed as:

$$f_{1,i}^*(t) = \min\left\{f_{1,i}^{mask}, \sqrt{\frac{Q_{1,i}(t)\tau P_{1,mask}^l}{3V K_i L_i}}\right\};$$

wherein, $0 \leq f_{1,i}(t) \leq f_{1,i}^{max}$, $\forall i \in \Omega_A$, t, $f_{1,i}^{max}$ is a maximum CPU clock speed of the mobile device i for service 1, $\tau$ is a time slot length, $P_{1,mask}^l$ denotes a maximum transmit power of the mobile device i for service 1, $L_i$ denotes a processing density of the mobile device i, in CPU cycles/bit, V is a control parameter, and $k_i$ is an effective switched capacitance of the mobile device i.

Further, the user association in step 4 is expressed as:

$$y_{1,ib}(t) = \begin{cases} 1, & b = \arg\min_{b \in \mathcal{B}}\{VP_{1,ib}^Z(t) - Q_{1,i}(t)R_{1,ib}^Z(t)\tau\}, \\ 0, & \text{otherwise} \end{cases};$$

wherein, $y_{1,ib}(t) \in \{0,1\}$, $\forall 1, b, t$, $\Sigma_{b \in \mathcal{B}} y_{1,ib}(t)=1$, $\forall i, b, t$, wherein $\mathcal{B}$ is a number of edge servers, $P_{1,ib}^Z(t)$ and $P_{1,ib}^Z(t)$ are a transmit power from the mobile device i to an edge server b in a slot t and a transmit rate from the mobile device i to the edge server b in the slot t, respectively.

Further, the sub-carrier assignment in step 5 is expressed as:

$$\rho_{1,ib}^{n_1^*}(t) = \begin{cases} 1, & \text{if } n_1 = \arg_{n_1 \in \omega_{1,i,b}^{n_1}}(t) \& \omega_{1,ib}^{n_1}(t) < 0, \\ 0, & \text{otherwise} \end{cases};$$

wherein, $\omega_{1,ib}^{n_1}(t)$ is a weight value, $\Sigma_{b \in \mathcal{B}} \Sigma_{i \in \Omega_A(b)} \rho_{1,ib}^{n_1}(t) \leq 1$, $\forall n_1, b, t$, $$\omega_{1,ib}^{n_1}(t) = \nabla f_i^T(v^m(t))\log(P_{1,ib}^{n_1^*}(t)) - \frac{VP_{1,ib}^{n_1^*}(t)}{P_{1,i}^{mask}},$$

v(t) is a parameter related to the sub-carrier assignment $\rho_1(t)$, m is an index of iteration, and f(•) is a Taylor expansion with respect to v(t).

Further, the power allocation in step 5 is expressed as:

$$P_{1,ib}^{n_1^*}(t) = \frac{s_{i,b}^{n_1^*}(t)}{\rho_{1,ib}^{n_1}(t)} = \left[\frac{\frac{\partial f_i(v^m(t))}{\partial v_{i,b}^{n_1}(t)}}{\sum_{c \in \mathcal{B}, c \neq b}\frac{\tau Q_{1,i}(t)\rho_{1,ib}^{n_1}(t)g_{1,ic}^{n_1}(t)}{\left(\sum_{l \neq c}\sum_{j \in \Omega_A(l)}\rho_{1,jl}^{n_1}(t)P_{1,jl}^{n_1}(t)g_{1,jc}^{n_1}(t) + \sigma_i^2(t)\right)\ln 2} + \frac{V\rho_{1,ib}^{n_1}(t)}{P_{1,i}^{mask}} - \rho_{1,ib}^{n_1}(t)\alpha_i(t)}\right]^+;$$

wherein, $\Sigma_{b \in \mathcal{B}} \Sigma_{n_1=1}^{N_1(t_k)} \rho_{1,ib}^{n_1}(t) P_{1,ib}^{n_1}(t) \leq P_{1,i}^{max}$, $\forall i \in \Omega_A(b)$, b, t, $g_{1,ic}^{n_1}(t)$ is a channel gain from the mobile device i to an edge server c in a slot t, $\sigma(t)$ is a noise power, $\Omega_A$ is a set of mobile devices.

Further, the video quality decision in step 6 is expressed as:

$$\mu_{2,i}^*(t) = \min\left\{\frac{\beta_i V}{U_i^{max}\ln 2 Q_{2,i}(t)}, \mu_{2,i}^{mask}\right\};$$

wherein, $\mu_{2,i}^{mask}$ corresponds to a service quality level $U_k$ expressed as:

$$U_i(\mu_{2,i}(t)) = PSNR_i(t) = \beta_i \log_2(\mu_{2,i}(t));$$

wherein, $\Phi_0(N(t_k))$ is given by $$\Phi(N(t_k)) = V\left[\sum_{i \in \Omega_A}\left(\sum_{b \in \mathcal{B}}\sum_{n_1=1}^{N_1(t_k)}\frac{y_{1,ib}(t)\rho_{1,ib}^{n_1}(t)P_{1,ib}^{n_1}(t)}{P_{1,i}^{max}} + \frac{P_{1,i}^l(t)}{P_{1,max}^l}\right) - \sum_{i \in \Omega_B}\sum_{b \in \mathcal{B}}\frac{y_{2,bi}(t)\beta_i \log_2(\mu_{2,i}(t))}{U_i^{max}}\right] -$$

$$\sum_{b \in \mathcal{B}}\sum_{i \in \Omega_A}\sum_{n_1=1}^{N_1(t_k)} Q_{1,i}(t)y_{1,ib}(t)\rho_{1,ib}^{n_1}(t)R_{1,ib}^{n_1}(t)\tau -$$

$$\sum_{b \in \mathcal{B}}\sum_{i \in \Omega_B}\sum_{n_2=1}^{N_2(t_k)} Q_{2,i}(t)y_{2,bi}(t)\rho_{2,bi}^{n_2}(t)R_{2,bi}^{n_2}(t)\tau -$$

$$\sum_{i \in \Omega_A} Q_{1,i}(t)f_{1,i}(t)L_i^{-1}\tau - \sum_{i \in \Omega_B} Q_{2,i}(t)\mu_{2,i}(t).$$

Another objective of the present invention is to provide a computer-readable storage medium, wherein a computer program is stored in the computer-readable storage medium, and when the computer program is executed by a processor, the processor executes the following steps: obtaining network data volumes of two services; obtaining queue statuses at a time t; computing sub-channel slices; computing a local CPU speed scaling, a user association, a sub-carrier assignment, and a power allocation of service 1; computing a user association, a video quality decision, and a sub-carrier assignment of service 2; obtaining an initial sub-carrier assignment and an initial power allocation; obtaining the user association; obtaining the power allocation and the sub-carrier assignment of service 1; obtaining the video quality decision; obtaining the sub-carrier assignment of service 2; obtaining an optimal data transmission rate and the user association to obtain a data rate allocation; and obtaining an optimal CPU speed scaling, an optimal user association, an optimal sub-carrier assignment, an optimal power allocation, an optimal video quality decision and an optimal sub-channel allocation.

Another objective of the present invention is to provide a system for joint optimization of resource allocation for implementing the aforementioned method for joint optimization of resource allocation. The system for joint optimization of resource allocation includes:

a data acquisition module, configured for obtaining network data volumes of two services, and obtaining queue statuses at a time t;

a data computation module, configured for computing sub-channel slices, computing a local CPU speed scaling, a user association, a sub-carrier assignment, and a power allocation of service 1, computing a user association, a video quality decision, and a sub-carrier assignment of service 2, and obtaining an initial sub-carrier assignment and an initial power allocation;

a data processing module, configured for obtaining the user association, obtaining the power allocation and the sub-carrier assignment of service 1, obtaining the video quality decision, obtaining the sub-carrier assignment of service 2, and obtaining an optimal data transmission rate and the user association to obtain a data rate allocation;

and a data result output module, configured for obtaining an optimal CPU speed scaling, an optimal user association, an optimal sub-carrier assignment, an optimal power allocation, an optimal video quality decision and an optimal sub-channel allocation.

Another objective of the present invention is to provide a mobile edge computing system for implementing the aforementioned method for joint optimization of resource allocation.

With a combination of all the above technical solutions, the present invention has the following advantages. In the present invention, the user association, the computation offloaded CPU speed scaling, power allocation, sub-carrier assignment, and video quality decision are jointly optimized to minimize the power consumption for service 1 while maximizing the satisfaction for service 2, so that the MEC system maintains the most balanced performance when providing users with multiple different types of services simultaneously. A mixed-integer nonlinear programming problem is proposed. In order to reduce the complexity of directly solving this problem, a highly efficient algorithm is designed by decoupling the optimization variables.

The present invention proposes a framework for joint optimization of wireless and computing resources for a mobile edge computing system oriented to multiple types of services, and investigates the performance of the system. In particular, power consumption and user satisfaction are used as two performance indicators of the MEC system. Through joint optimization of multiple indicators, the system achieves an optimal performance trade-off. Compared with the prior solutions based on a mobile edge computing system oriented to multiple types of services, the resource allocation and dynamic sub-channel slicing method proposed by the present invention is easy to operate and is conducive to optimizing the network and improving the performance of the system.

BRIEF DESCRIPTION OF THE DRAWINGS

In order to explain the technical solutions of the embodiments of the present invention more clearly, the drawings used in the embodiments of the present invention will be briefly introduced below. Obviously, the drawings described below are only some embodiments of the present invention. For those of ordinary skill in the art, other drawings can be obtained based on these drawings without creative efforts.

In FIG. 2: 1 represents data acquisition module; 2 represents data computation module; 3 represents data processing module; and 4 represents data result output module.

DETAILED DESCRIPTION OF THE EMBODIMENTS

In order to make the objectives, technical solutions, and advantages of the present invention clearer, the present invention will be further described in detail below in conjunction with the embodiments. It should be understood that the specific embodiments described herein are only used to explain the present invention, rather than to limit the present invention.

In view of the problems identified in the prior art, the present invention provides a method, system, storage medium and application for joint optimization of resource allocation by employing a dynamic sub-channel allocation and resource allocation (DSARA) algorithm, a successive convex approximation (SCA)-based power allocation and sub-carrier assignment algorithm, a sub-channel allocation algorithm, and a resource allocation algorithm with a given sub-channel allocation strategy. Among them, the DSARA algorithm executes the following steps: obtaining the local CPU speed scaling, the sub-carrier assignment, the power allocation, the user association, and the video quality decision. The present invention will be described in detail below in conjunction with the drawings.

Figure 1:
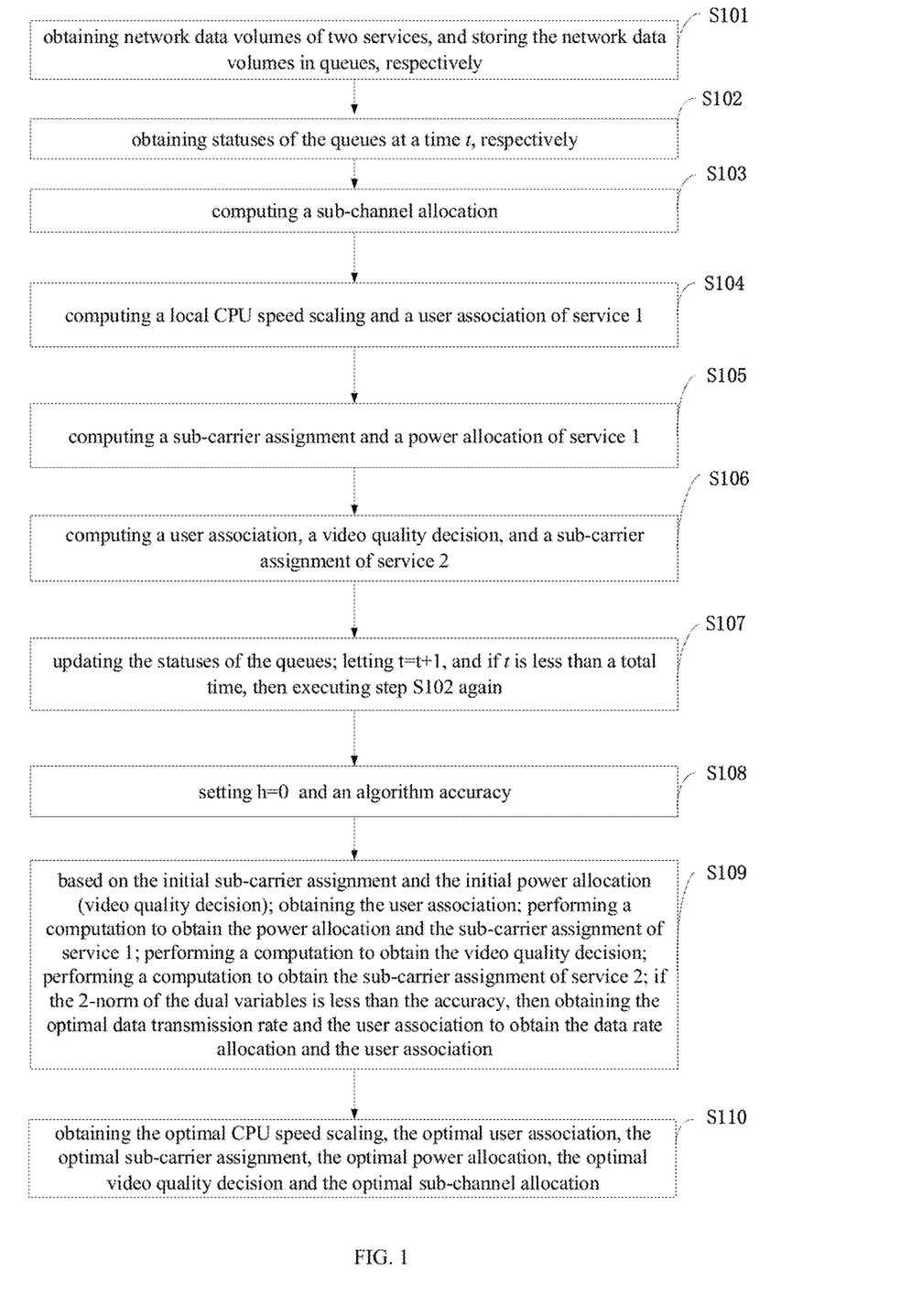
FIG. 1 is a flow chart of a method for joint optimization of resource allocation according to an embodiment of the present invention.

As shown in FIG. 1, according to the present invention, a method for joint optimization of resource allocation includes the following steps:

S101: network data volumes of two services are obtained and stored in queues, respectively;

S102: statuses of the queues at the time t are obtained, respectively;

S103: sub-channel slices are computed;

S104: the local CPU speed scaling and the user association of service 1 are computed;

S105: the sub-carrier assignment and the power allocation of service 1 are computed;

S106: the user association, the video quality decision, and the sub-carrier assignment of service 2 are computed;

S107: the statuses of the queues are updated; letting t=t+1, and if t is less than a total time, then step S102 is executed again;

S108: h=0 and an algorithm accuracy ε>0 are set;

S109: the initial sub-carrier assignment and the initial power allocation (video quality decision) are obtained; the user association is obtained; a computation is performed to obtain the power allocation and the sub-carrier assignment of service 1; a computation is performed to obtain the video quality decision; a computation is performed to obtain the sub-carrier assignment of service 2; if the 2-norm of the dual variables is less than the accuracy, then the optimal data transmission rate and the user association are obtained to obtain the data rate allocation and the user association;

S110: the optimal CPU speed scaling, the optimal user association, the optimal sub-carrier assignment, the optimal power allocation, the optimal video quality decision and the optimal sub-channel allocation are obtained.

Those of ordinary skill in the art can also implement the method for joint optimization of resource allocation of the present invention by using other steps. FIG. 1 only illustrates a specific embodiment of the method for joint optimization of resource allocation of the present invention. The embodiment of the present invention describes a specific optimization allocation and processing strategy in the case where a user uses two different services simultaneously. Mobile devices in service 1 have relatively weak computing power, and thus cannot meet the requirements of computationally-intensive applications. Mobile devices in service 2 are capable of downloading video data from the MEC server through downlink transmission, and are capable of controlling the video quality according to network conditions.

Figure 2:
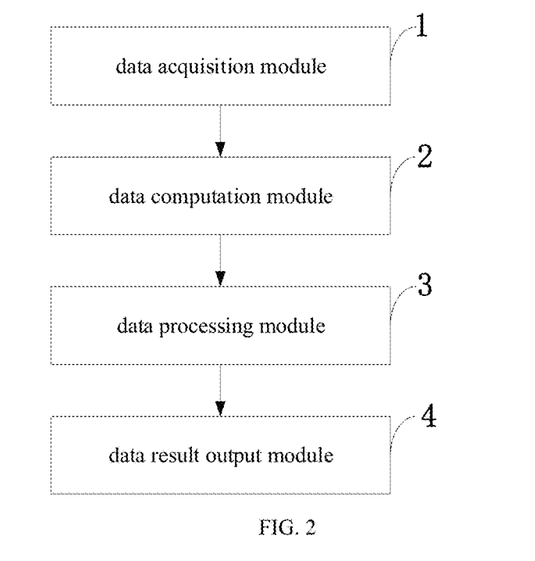
FIG. 2 is a structural schematic diagram of a system for joint optimization of resource allocation according to an embodiment of the present invention.

As shown in FIG. 2, according to the present invention, a system for joint optimization of resource allocation includes:

the data acquisition module 1, configured for obtaining network data volumes of two services, and obtaining queue statuses at a time t;

the data computation module 2, configured for computing sub-channel slices, computing a local CPU speed scaling, a user association, a sub-carrier assignment, and a power allocation of service 1, computing a user association, a video quality decision, and a sub-carrier assignment of service 2, and obtaining an initial sub-carrier assignment and an initial power allocation;

the data processing module 3, configured for obtaining the user association, obtaining the power allocation and the sub-carrier assignment of service 1, obtaining the video quality decision, obtaining the sub-carrier assignment of service 2, and obtaining an optimal data transmission rate and the user association to obtain a data rate allocation; and the data result output module 4, configured for obtaining an optimal CPU speed scaling, an optimal user association, an optimal sub-carrier assignment, an optimal power allocation, an optimal video quality decision and an optimal sub-channel allocation.

The technical solutions of the present invention will be further described below in conjunction with the drawings.

Figure 3:
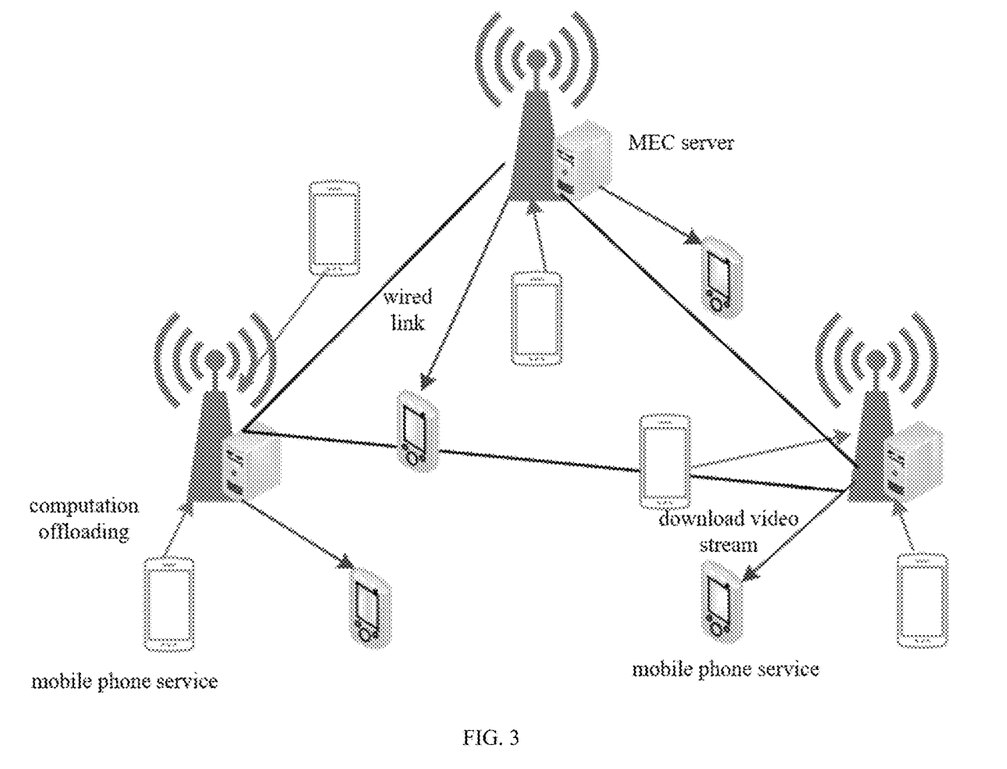
FIG. 3 is a schematic diagram of a communication model according to an embodiment of the present invention.

FIG. 3 shows a scene graph to which the method of the present invention can be applied. As shown in FIG. 3, an orthogonal frequency division multiple access (OFDMA)-based MEC network provides two different services, namely computation offloading (service 1) and on-demand video streaming (service 2), in which there are $\mathcal{B}=\{1, \ldots, B\}$ single-antenna base stations (BSs) with MEC servers. All base stations are connected via wired links. Let $B=\{1, \ldots, B\}$ denotes a set of the BSs. In the present invention, a pre-configured server caches some video contents for being downloaded by the mobile devices. According to service requirements, the mobile devices can be divided into two categories, which are denoted as sets $\Omega_A=\{1, 2, \ldots, M_1\}$ and $\Omega_B=\{1, 2, \ldots, M_2\}$. In the present invention, assuming that the mobile devices in service 1 have relatively weak computing power and cannot meet the requirements of computationally-intensive applications, then the mobile devices in service 1 need to offload some or all of the data to the MEC server through uplink transmission. The mobile devices in service 2 are capable of downloading the video data from the MEC server through downlink transmission, and are capable of controlling the video quality according to network conditions.

Figure 4:
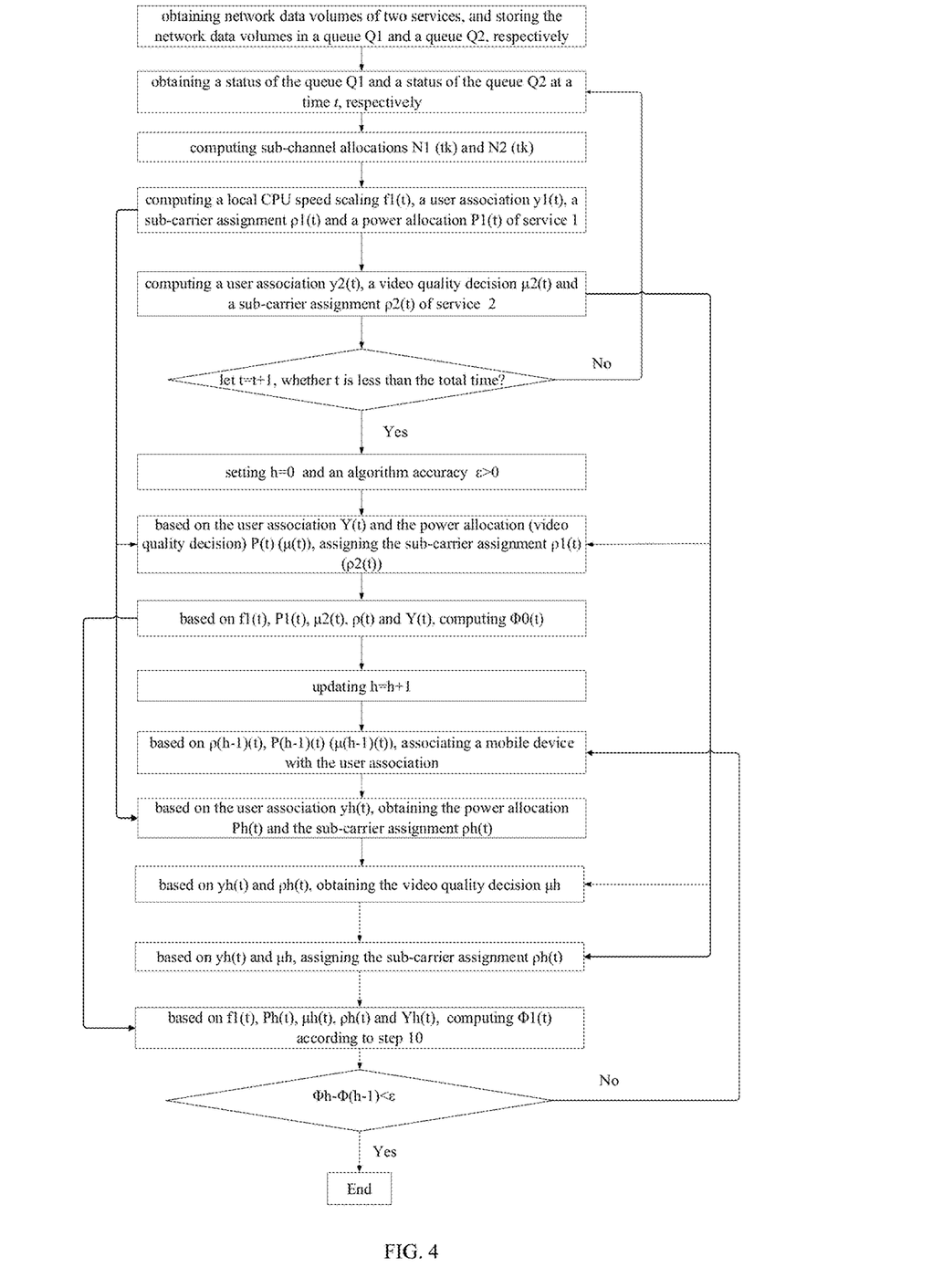
FIG. 4 is a flow chart of an implementation of the method for joint optimization of resource allocation according to an embodiment of the present invention.

As shown in FIG. 4, according to the present invention, the method for joint optimization of resource allocation for a mobile edge computing system oriented to multiple types of services includes the following steps:

step 1: obtaining the network data volumes of service 1 and service 2, and storing the network data volumes in a queue $Q_1$ and a queue $Q_2$, respectively;

step 2: obtaining a status of the queue $Q_1$ and a status of the queue $Q_2$ at the time t, respectively;

step 3: computing the sub-channel slices $N_1(t_k)$ and $N_2(t_k)$;

step 4: computing the local CPU speed scaling $f_1(t)$ and the user association (t) of service 1;

step 5: computing the sub-carrier assignment $p_1(t)$ and the power allocation $P_1(t)$ of service 1;

step 6: computing the user association $y_2(t)$, the video quality decision $\mu_2(t)$, and the sub-carrier assignment $p_2(t)$ of service 2;

step 7: updating the status of the queue $Q_1$ and the status of the queue $Q_2$; letting $t=t+1$, and if t is less than a total time, then executing step 2 again;

step 8: setting $h=0$ and an algorithm accuracy $\varepsilon>0$;

step 9: based on a user association $Y_0(t)=(y_1(t),y_2(t))$, a power allocation $P_1^0(t)$ and a video quality decision $\mu_2^0(t)$, assigning a sub-carrier assignment $p_1^0(t)$ according to step 5, and assigning a sub-carrier assignment $\rho_2^0(t)$ according to step 6;

step 10: computing $\Phi_0(N(t_k))$ based on $f_1(t)$, $P_1^0(t)$, $\mu_2^0(t)$, $p^0(t)$, and $Y_0(t)$;

step 11: updating $h=h+1$;

step 12: based on $\rho^{h-1}(t)$ and $P_1^{h-1}(t)(\mu_2^{h-1}(t))$, associating a mobile device with a user association $Y_h(t)=(y_1^h(t), y_2^h(t))$;

step 13: based on a user association $y_1^h(t)$, obtaining a power allocation $P_1^h(t)$ and a sub-carrier assignment $\rho_1^h(t)$ according to step 5;

step 14: based on $y_2^h(t)$, obtaining a video quality decision $\mu_2^h(t)$ according to step 6;

step 15: based on $y_2^h(t)$ and $\mu_2^h(t)$, assigning a sub-carrier assignment $\rho_2^h(t)$ according to step 6;

step 16: based on $f_1(t)$, $P_1^h(t)$, $\mu_2^h(t)$, $\rho^h(t)=(\rho_1^h(t), p_2^h(t))$, and $Y_h(t)$, computing $\Phi_h(N(t_k))$ according to step 10, if $\Phi_h(N(t_k))-\Phi_{h-1}(N(t_k))<\varepsilon$, then obtaining the optimal CPU speed scaling, the optimal user association, the optimal sub-carrier assignment, the optimal power allocation, the optimal video quality decision, and the optimal sub-channel allocation; and if $\Phi_h(N(t_k))-\Phi_{h-1}(N(t_k))\geq\varepsilon$, executing step 12 again.

In a preferred embodiment of the present invention, the local CPU speed scaling in step 4 is expressed as:

$$f_{1,i}^* = \min\left\{f_{1,i}^{max}, \sqrt{\frac{Q_{1,i}(t)\tau P_{1,mask}^l}{3Vk_iL_i}}\right\};$$

wherein, $0 \leq f_{1,i}(t) \leq f_{1,i}^{max}$, $\forall i \in \Omega_A$, t, $f_{1,i}^{max}$ is a maximum CPU clock speed of the mobile device i for service 1, $\tau$ is a time slot length, $P_{1,mask}^l$ denotes a maximum transmit power of the mobile device i for service 1, $L_i$ denotes a processing density of the mobile device i, in CPU cycles/bit, V is a control parameter, and $k_i$ is an effective switched capacitance of the mobile device i.

In a preferred embodiment of the present invention, the user association in step 4 is expressed as:

$$y_{1,ib}(t) = \begin{cases} 1, & b = \underset{b \in B}{\arg\min}\{VP_{1,ib}^Z(t) - Q_{1,i}(t)R_{1,ib}^Z(t)\tau\}, \\ 0, & \text{otherwise} \end{cases};$$

wherein, $y_{1,ib}(t) \in \{0, 1\}$, $\forall 1, b, t$, $\Sigma_{b \in B} y_{1,ib}(t)=1$, $\forall i, b, t$, wherein $\mathcal{B}$ is a number of edge servers, $P_{1,ib}^Z(t)$ and $P_{1,ib}^Z(t)$ are a transmit power from the mobile device i to an edge server b in a slot t and a transmit rate from the mobile device i to the edge server b in the slot t, respectively.

In a preferred embodiment of the present invention, the sub-carrier assignment in step 5 is expressed as:

$$\rho_{1,ib}^{n_1^*}(t) = \begin{cases} 1, & \text{if } n_1 = \underset{\cdot}{\arg\max}_{\cdot}^{\cdot}(t) \& \omega_{1,ib}^{n_1}(t) < 0 \\ 0, & \text{otherwise} \end{cases};$$

wherein $w_{1,ib}^{n_1}(t)$ is a weight value, $\Sigma_{b \in \mathcal{B}} \Sigma_{i \in Q_A(b)} \rho_{1,ib}^{n_1}(t) \leq 1$, $\forall n_1, b, t$, $$\omega_{1,ib}^{n_1}(t) = \nabla f_i^T(v^m(t))\log(P_{1,ib}^{n_1^*}(t)) - \frac{VP_{1,ib}^{n_1^*}(t)}{P_{1,i}^{mask}},$$

v(t) is a parameter related to the sub-carrier assignment $p_1(t)$, m is an index of iteration, and f(•) is a Taylor expansion with respect to v(t).

In a preferred embodiment of the present invention, the power allocation in step 5 is expressed as:

$$P_{1,ib}^{n_1^*}(t) = $$

$$\frac{s_{i,b}^{n_1^*}(t)}{\rho_{1,ib}^{n_1^*}(t)} = \left[\frac{\frac{\partial f_i(v^m(t))}{\partial v_{i,b}^{n_1}(t)}}{\sum_{c \in \mathcal{B}, c \neq b}\frac{\tau Q_{1,i}(t)\rho_{1,ib}^{n_1}(t)g_{1,ic}^{n_1}(t)}{\left(\sum_{l \neq c}\sum_{j \in \Omega_A(l)}\rho_{1,jl}^{n_1}(t)P_{1,jl}^{n_1}(t)g_{1,jc}^{n_1}(t) + \sigma_i^2(t)\right)\ln 2} + \frac{VP_{1,ib}^{n_1}(t)}{P_{1,i}^{mask}} - \rho_{1,ib}^{n_1}(t)\alpha_i(t)}\right]^+;$$

wherein, $\Sigma_{b \in \mathcal{B}} \Sigma_{n_1=1}^{N_1(t_k)} \rho_{1,ib}^{n_1}(t) P_{1,ib}^{n_1}(t) \leq P_{1,i}^{max}$, $\forall i \in \Omega_A(b)$, b, t, $g_{1,ic}^{n_1}(t)$ is a channel gain from the mobile device i to an edge server c in a slot t, $\sigma(t)$ is a noise power, $\Omega_A$ is a set of mobile devices.

In a preferred embodiment of the present invention, the video quality decision in step 6 is expressed as:

$$\mu_{2,i}^*(t) = \min\left\{\frac{\beta_i V}{U_i^{max}\ln 2 Q_{2,i}(t)}, \mu_{2,i}^{mask}\right\};$$

wherein, $\mu_{2,i}^{mask}$ corresponds to a service quality level $U_k$ expressed as:

$$U_i(\mu_{2,i}(t)) = PSNR_i(t) = \beta_i \log_2(\mu_{2,i}(t));$$

wherein, $\Phi_0(N(t_k))$ is given by $$\Phi(N(t_k)) = V\left[\sum_{i \in \Omega_A}\left(\sum_{b \in B}\sum_{n_1=1}^{N_1(t_k)}\frac{y_{1,ib}(t)\rho_{1,ib}^{n_1}(t)P_{1,ib}^{n_1}(t)}{P_{1,i}^{max}} + \frac{P_{1,i}^l(t)}{P_{1,max}^l}\right) - \sum_{i \in \Omega_B}\sum_{b \in B}\frac{y_{2,bi}(t)\beta_i\log_2(\mu_{2,i}(t))}{U_i^{max}}\right] - \sum_{b \in B}\sum_{i \in \Omega_A}\sum_{n_1=1}^{N_1(t_k)}Q_{1,i}(t)y_{1,ib}(t)\rho_{1,ib}^{n_1}(t)R_{1,ib}^{n_1}(t)\tau - \sum_{b \in B}\sum_{i \in \Omega_B}\sum_{n_2=1}^{N_2(t_k)}Q_{2,i}(t)y_{2,bi}(t)\rho_{2,bi}^{n_2}(t)R_{2,bi}^{n_2}(t)\tau - $$

-continued $$\sum_{i\in\Omega_A} Q_{1,i}(t)f_{1,i}(t)L_i^{-1}\tau - \sum_{i\in\Omega_B} Q_{2,i}(t)\mu_{2,i}(t).$$

The present invention proposes a framework for allocation of wireless and computing resources for a mobile edge computing system oriented to multiple types of services, and investigates the performance of the MEC system when oriented to multiple services and proposes efficient algorithms. Therefore, the method based on the dynamic sub-channel slicing and resource allocation can solve the problem that the MEC system has low overall performance when oriented to multiple services simultaneously, thereby further improving the performance of the system. From the comparison between the mobile edge computing system oriented to multiple types of services of the present invention and the prior solutions based on a mobile edge computing system oriented to multiple types of services, it can be found that the dynamic sub-channel slicing and resource allocation method proposed by the present invention is easy to operate and is conducive to optimizing the network and improving the performance of the system.

The technical effects of the present invention will be described in detail below in conjunction with a simulation.

Figure 5:
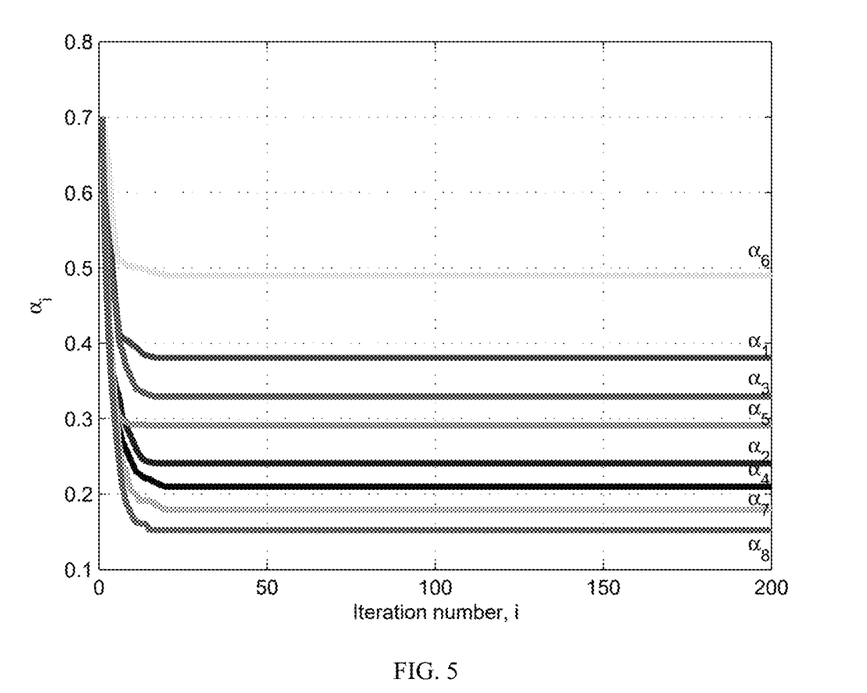
FIG. 5 is a graph showing the trend of dual variables $\alpha(t)=(\alpha_i(t))$ according to an embodiment of the present invention.
Figure 6:
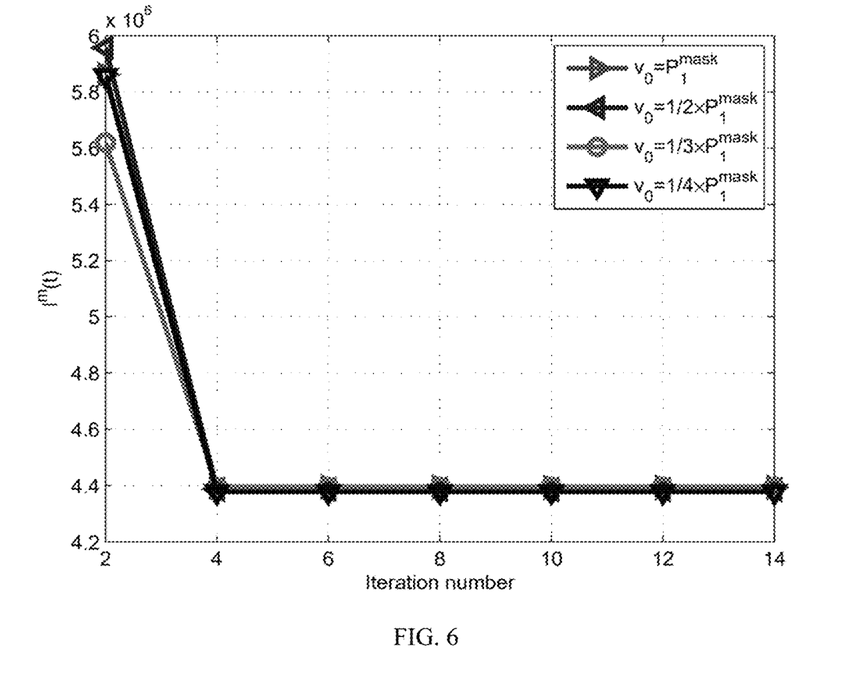
FIG. 6 is a graph showing the convergence of the outer loop of Algorithm 2 according to an embodiment of the present invention.
Figure 7:
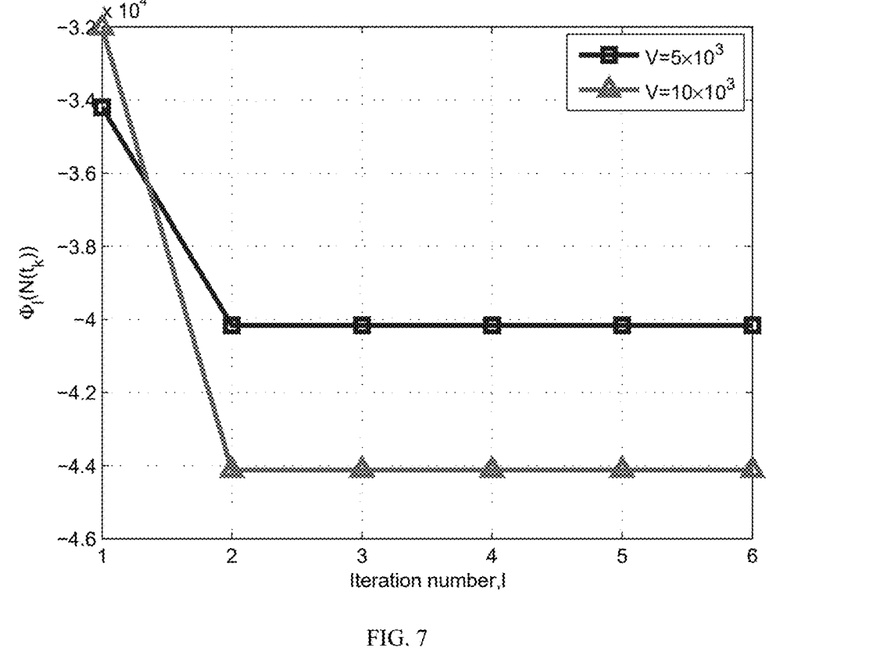
FIG. 7 is a graph showing the convergence of a resource allocation algorithm with a given sub-channel slicing strategy under different control parameter settings according to an embodiment of the present invention.

In the present invention, a network topology composed of one macro base station and five micro base stations is simulated, and has a scattering area of 1*1 km². The wireless channel is modeled as a frequency-selective channel, composed of twelve independent Rayleigh multipaths. The power of the components of the twelve multipaths is [0, −1.5, −4.0, −4.5, −3.5, −5, −8.0, −6.0, −8.5, −11.6, −12.2, −13.5] decibels. This simulation is based on a montecarlo simulation in Matlab simulator. The simulation produces the relevant data simulation results as shown in FIG. 5 to FIG. 12. FIG. 5 shows the trend of the dual variables $\alpha(t)=(\alpha_i(t))$ to demonstrate the convergence of the inner loop of the power allocation and sub-carrier assignment algorithm proposed by the present invention. As shown in FIG. 5, the algorithm converges fast. FIG. 6 shows the convergence of the outer loop of Algorithm 2. In other words, FIG. 6 demonstrates the convergence of the outer loop of the SCA-based power allocation and sub-carrier assignment algorithm. As shown in FIG. 6, the SCA-based power allocation and sub-carrier assignment algorithm also converges very fast, and its initial points do not affect the final result. FIG. 7 shows the convergence of a resource allocation algorithm with a given sub-channel slicing strategy under different control parameter settings according to the present invention. FIGS. 5-7 prove that the low-complexity algorithm for decoupling optimization variables according to the present invention is generally economical and effective. Next, in order to verify the performance of the system of the present invention, the following solutions are considered.

JONCUSP: This solution is the same as the solution proposed by the present invention, except that it has a fixed video quality decision of service 2.

LNUSP: All computational tasks in this solution are executed locally for service 1.

FNUSP: This solution completely offloads tasks to service 1.

FS-JOCUSPU: This solution performs a joint optimization of the local CPU speed scaling, the user association, the sub-carrier assignment and the power allocation of service 1, and performs a joint optimization of the user association, the sub-carrier assignment and the video quality decision (each sub-channel slice is fixed) of service 2.

Figure 8:
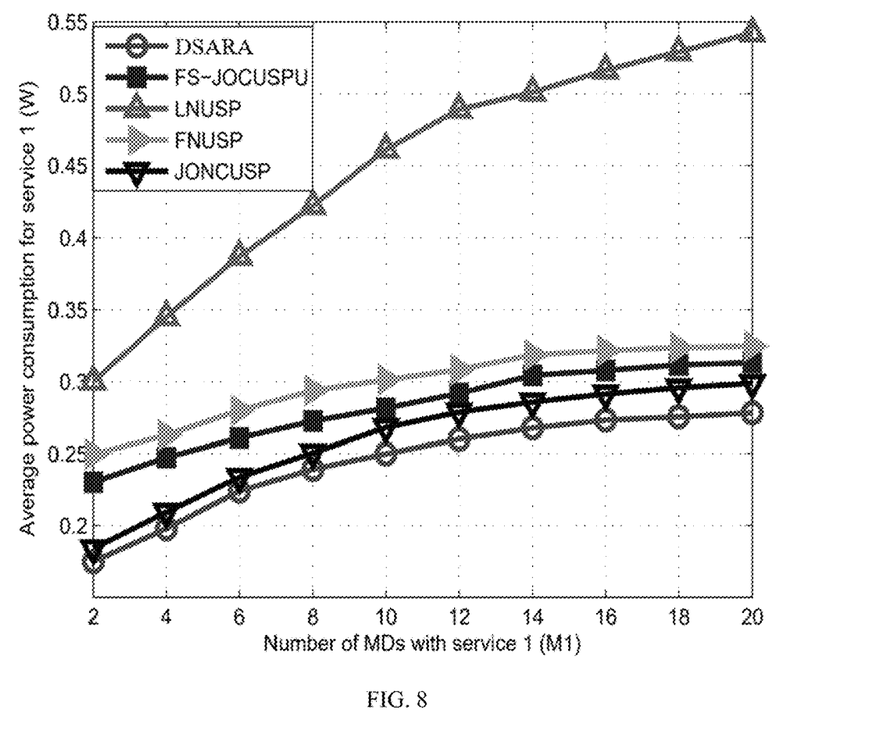
FIG. 8 is a graph showing the average power consumption for service 1 according to an embodiment of the present invention.
Figure 9:
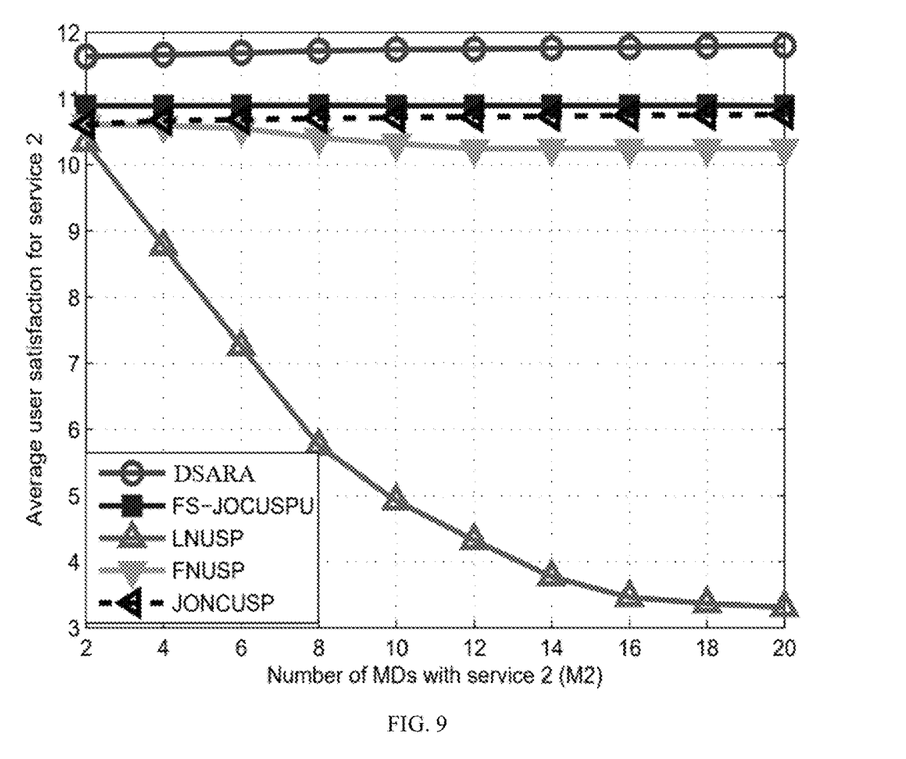
FIG. 9 is a graph showing the influence of the number of mobile devices (M2) on the average user satisfaction for service 2 in five solutions according to an embodiment of the present invention.
Figure 10:
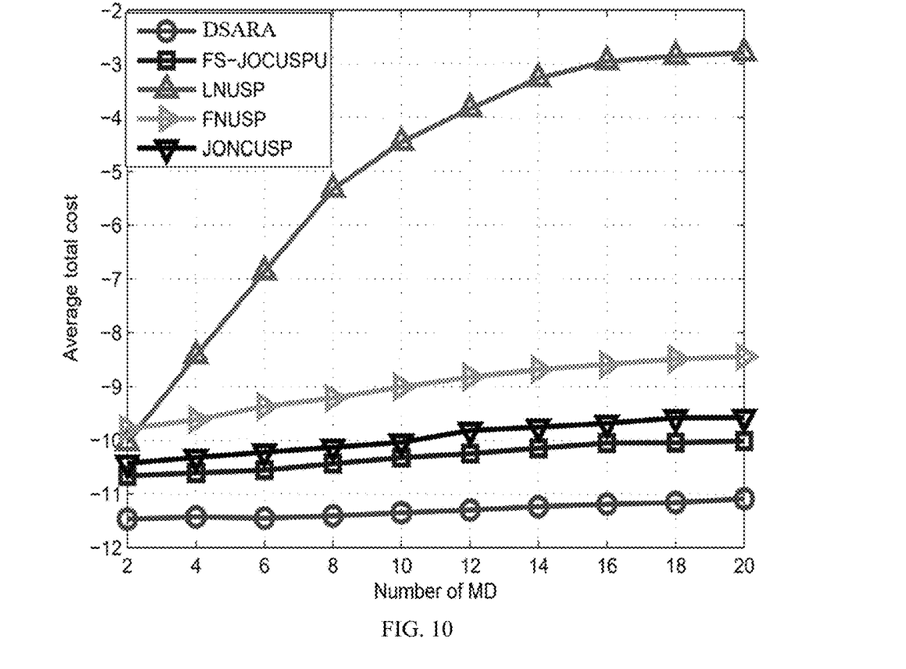
FIG. 10 is a graph showing the influence of the number of mobile devices (M2) on the average total cost for service 2 in the five solutions according to an embodiment of the present invention.

FIGS. 8-10 show the average consumption for service 1, the average user satisfaction for service 2, and the average total cost for the system in comparison with different solutions and different algorithms. FIG. 8 and FIG. 9 show the comparison of DSARA with JONCUSP, LNUSP, FNUSP, and FS-JOCUSPU for service 1 and service 2, respectively. FIG. 8 shows the average power consumption for service 1. For all algorithms, the average power consumption continues to increase with the number of mobile devices (M1). The results show that the curves of all solutions grow slowly with the exception of LNUSP. Specifically, DSARA grows the slowest, while LNUSP grows rapidly. This is because these tasks are executed locally to consume a substantial amount of energy due to the limited computing resources. FIG. 9 shows the influence of the number of mobile devices (M2) on the average user satisfaction for service 2 in the five solutions. As the number of mobile devices (M2) increases, the average user satisfaction for each of DSARA, FS-JOCUSPU, FNUSP and JONCUSP remains almost unchanged, while the average user satisfaction for LNUSP declines rapidly. FIG. 10 shows the relationship between the average total cost and the number of mobile devices, where the two services have the same number of mobile devices, that is, M1=M2. It can be seen that the solution provided by the present invention is superior to F S-JOCUSPU in terms of sub-carrier slicing performance, which implies that dynamic sub-channel slicing can improve the performance of the system. However, the average total cost of FNUSP and the average total cost of JONCUSP are lower than that of FS-JOCUSPU. In this regard, it is recommended to separately dynamically allocate each sub-channel within a limited time to achieve the purpose of dynamic allocation. In addition, in comparison with the LNUSP solution and the FNUSP solution, it is observed that DSARA is superior to the other two solutions in terms of performance. This shows that partial offloading can reduce more power consumption than complete offloading and local execution.

Figure 11:
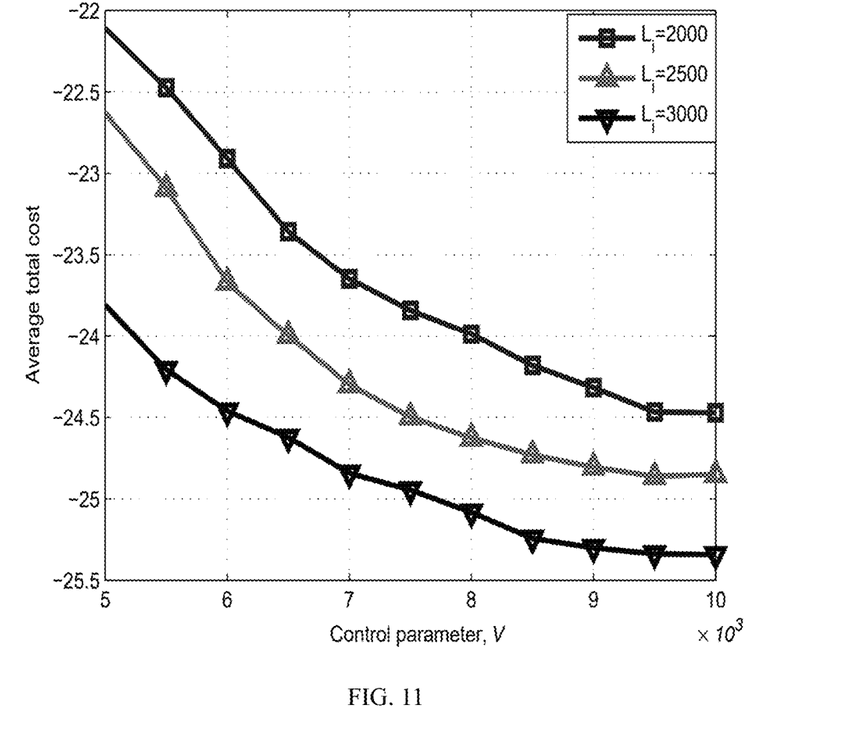
FIG. 11 is a graph showing the relationship between the parameter V and the total cost of the system according to an embodiment of the present invention.
Figure 12:
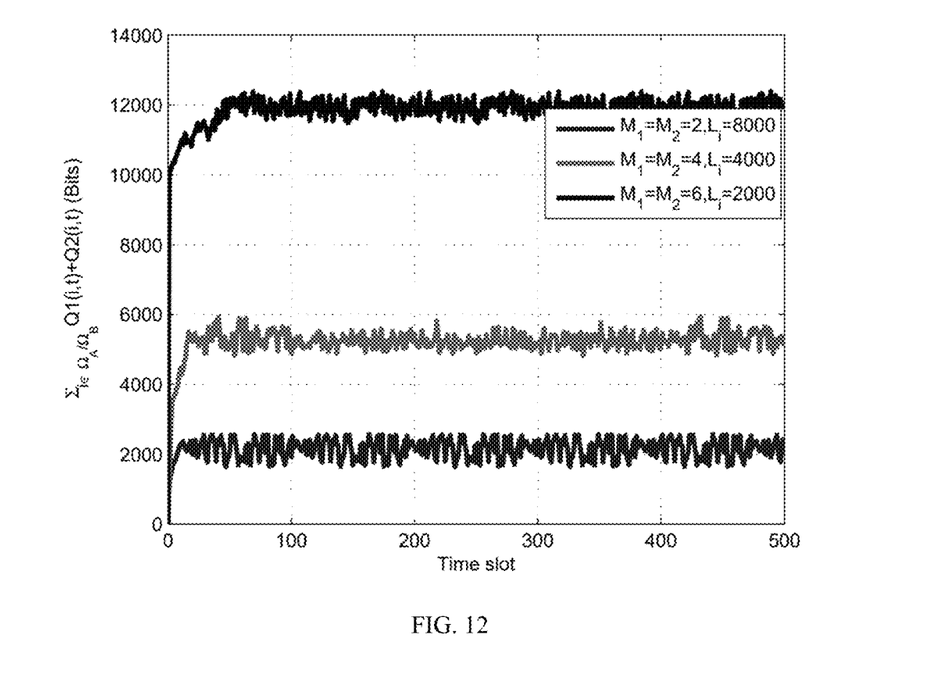
FIG. 12 is a graph showing the performance of a dynamic sub-channel allocation and resource allocation (DSARA) algorithm under different conditions according to an embodiment of the present invention.

FIG. 11 shows the relationship between the parameter V and the total cost of the system. As shown in FIG. 11, in order to enable the heterogeneous network to work in a predetermined or ideal state, a relatively large control parameter V is required. FIG. 12 shows the performance of the DSARA algorithm under different conditions according to the present invention. When M1=M2=2, M1=M2=4, and M1=M2=6, the total queue length of the buffer area starts to increase and stabilizes at 2000 bits, 5000 bits, and 12000 bits, respectively. In addition, it is observed that the convergence time increases as the number of mobile devices increases. However, there is a small difference in the convergence time, and the buffering under the three conditions is stabilized within about 50 time slots. It can, therefore, be concluded that the proposed algorithm can be extended to the system when having a reasonable number of mobile devices.

It should be noted that the embodiments of the present invention can be implemented by hardware, software, or a combination of software and hardware. The hardware part can be implemented by dedicated logic. The software part can be stored in a memory, and the system can be executed by appropriate instructions, for example, the system can be executed by a microprocessor or dedicated hardware. Those of ordinary skill in the art can understand that the above-mentioned devices and methods can be implemented by using computer-executable instructions and/or control codes included in a processor. Such codes are provided, for example, on a carrier medium such as a magnetic disk, compact disc (CD) or digital video disk read-only memory (DVD-ROM), a programmable memory such as a read-only memory (firmware), or a data carrier such as an optical or electronic signal carrier. The device and its modules of the present invention can be implemented by very large-scale integrated circuits or gate arrays, semiconductors such as logic chips and transistors, or programmable hardware devices such as field programmable gate arrays and programmable logic devices, and other hardware circuits. Optionally, the device and its modules of the present invention can be implemented by software executed by various types of processors, or can be implemented by a combination of the hardware circuit and the software as mentioned above, such as firmware.

The above only describes the specific embodiments of the present invention, but the scope of protection of the present invention is not limited thereto. Any modifications, equivalent replacements, improvements and others made by any person skilled in the art within the technical scope disclosed in the present invention and the spirit and principle of the present invention shall fall within the scope of protection of the present invention.

What is claimed is:

1. A method for a joint optimization of a resource allocation, comprising:

step 1: obtaining network data volumes of a first service and second service, and storing the network data volumes in a queue $Q_1$ and a queue $Q_2$, respectively;

step 2: obtaining a status of the queue $Q_1$ and a status of the queue $Q_2$ at the time t, respectively;

step 3: computing sub-channel slices $N_1(t_k)$ and $N_2(t_k)$;

step 4: computing a local CPU speed scaling $f_1(t)$ and a user association $y_1(t)$ of the first service;

step 5: computing a sub-carrier assignment $\rho_1(t)$ and power allocation $P_1(t)$ of the first service;

step 6: computing a user association $y_2(t)$, a video quality decision $\mu_2(t)$, and a sub-carrier assignment $\rho_2(t)$ of the second service;

step 7: updating the status of the queue $Q_1$ and the status of the queue $Q_2$; letting t=t+1, and if t is less than a total time, then executing step 2 again;

step 8: setting h=0 and an algorithm accuracy $\varepsilon>0$;

step 9: based on a user association $Y_0(t)=(y_1(t), y_2(t))$, a power allocation $P_1^0(t)$ and a video quality decision $\mu_2^0(t)$, assigning a sub-carrier assignment $\rho_1^0(t)$ according to step 5, and assigning a sub-carrier assignment $\rho_2^0(t)$ according to step 6;

step 10: computing $\Phi_0(N(t_k))$ based on $f_1(t)$, $P_1^0(t)$, $\mu_2^0(t)$, $\rho^0(t)$, and $Y_0(t)$;

step 11: updating h=h+1;

step 12: based on $\rho^{h-1}(t)$ and $P_1^{h-1}(t)(\mu_2^{h-1}(t))$, associating a mobile device with a user association $Y_h(t)=(y_1^h(t), y_2^h(t))$;

step 13: based on a user association $y_1^h(t)$, obtaining a power allocation $P_1^h(t)$ and a sub-carrier assignment $\rho_1^h(t)$ according to step 5;

step 14: based on $y_2^h(t)$ and $\rho_2^{h-1}(t)$, obtaining a video quality decision $\mu_2^h(t)$ according to step 6;

step 15: based on $y_2^h(t)$ and $\mu_2^h(t)$, assigning a sub-carrier assignment $\rho_2^h(t)$ according to step 6;

step 16: based on $f_1(t)$, $P_1^h(t)$, $\mu_2^h(t)$, $\rho^h(t)=(\rho_1^h(t), \rho_2^h(t))$, and $Y_h(t)$, computing $\Phi_h(N(t_k))$ according to step 10, if $\Phi_h(N(t_k))-\Phi_{h-1}(N(t_k))\leq\varepsilon$, then obtaining the optimal CPU speed scaling, the optimal user association, the optimal sub-carrier assignment, the optimal power allocation, the optimal video quality decision, and the optimal sub-channel allocation; and if $\Phi_h(N(t_k))-\Phi_{h-1}(N(t_k))>\varepsilon$, executing step 12 again.

2. The method according to claim 1, wherein the local CPU speed scaling in step 4 is expressed as:

$$f_{1,i}^* = \min\left\{f_{1,i}^{max}, \sqrt{\frac{Q_{1,i}(t)\tau P_{1,mask}^l}{3Vk_iL_i}}\right\};$$

wherein, $0\leq f_{1,i}(t)\leq f_{1,i}^{max}$, $\forall i \in \Omega_A$, t, $f_{1,i}^{max}$ is a maximum CPU clock speed of the mobile device i for the first service, $\tau$ is a time slot length, $P_{1,mask}^l$ denotes a maximum transmit power of the mobile device i for the first service, $L_i$ denotes a processing density of the mobile device i, in CPU cycles/bit, V is a control parameter, and $k_i$ is an effective switched capacitance of the mobile device i.

3. The method according to claim 1, wherein the user association in step 4 is expressed as:

$$y_{1,ib}(T) = \begin{cases} 1, & b = \arg\min_{b\in B}\{VP_{1,ib}^Z(T) - Q_{1,i}(T)R_{1,ib}^Z(T)\tau\}, \\ 0, & \text{otherwise} \end{cases};$$

wherein, $y_{1,ib}(t) \in \{0,1\}$, $\forall 1, b, t$, $\Sigma_{b\in B} y_{1,ib}(t)=1$, $\forall i, b, t$, wherein $B$ is a number of edge servers, $P_{1,ib}^Z(t)$ and $P_{1,ib}^Z(t)$ are a transmit power from the mobile device i to an edge server b in a slot t and a transmit rate from the mobile device i to the edge server b in the slot t, respectively.

4. The method according to claim 1, wherein the sub-carrier assignment in step 5 is expressed as:

$$\rho_{1,ib}^{n_1^*}(t) = \begin{cases} 1, & \text{if } n_1 = \arg\min_{n_{1,ib}}(t) \& \omega_{1,ib}^{n_1}(t) < 0, \\ 0, & \text{otherwise} \end{cases};$$

wherein, $\omega_{1,ib}^{n_1}(t)$ is a weight value, $\Sigma_{b\in B} \Sigma_{i\in\Omega_A(b)}\rho_{1,ib}^{n_1}(t)\leq 1$, $\forall n_1, b, t$, $$\omega_{1,ib}^{n_1}(t) = \nabla f_i^T(v^m(t))\log(P_{1,ib}^{n_1^*}(t)) - \frac{VP_{1,ib}^{n_1^*}(t)}{P_{1,i}^{mask}},$$

v(t) is a parameter related to the sub-carrier assignment $\rho_1(t)$, m is an index of iteration, and f(·) is a Taylor expansion with respect to v(t).

5. The method according to claim 1, wherein the power allocation in step 5 is expressed as:

$$P_{1,ib}^{n_1*}(T) = \frac{s_{i,b}^{n_1*}(t)}{\rho_{1,ib}^{n_1*}(t)} = \left[\frac{\frac{\partial f_i(v^m(t))}{\partial v_{ib}^{n_1}(t)}}{\sum_{c \in B, c \neq b} \frac{\tau Q_{1,i}(t) \rho^{n_1}(t)_1 q_1^{n_1}(t)}{(\sum_{l \neq c} \sum_{j \in \Omega_A(t)} \rho_{1,jl}^{n_1}(t) P_{1,jl}^{n_1}(t)_1 g_{1,jc}^{n_1}(t) + \sigma_i^2(t))\ln 2} + \frac{V \rho_{1,ib}^{n_1}(t)}{P_{1,i}^{mask}} - \rho_{1,ib}^{n_1}(t)\alpha_i(t)}\right]^+;$$

wherein, $\sum_{b \in B} \sum_{n_1=1}^{N_1(t_k)} \rho_{1,ib}^{n_1}(t) P_{1,ib}^{n_1}(t) \leq P_{1,i}^{max}$, $\forall i \in \Omega_A(b)$, b, t, $g_{1,ic}^{n_1}(t)$ is a channel gain from the mobile device i to an edge server c in a slot t, σ(t) is a noise power, $\Omega_A$ is a set of mobile devices.

6. The method according to claim 1, wherein the video quality decision in step 6 is expressed as:

$$\mu_{2,i}^*(t) = \min\left\{\frac{\beta_i V}{U_i^{max} \ln 2 Q_{2,i}(t)}, \mu_{2,i}^{mask}\right\};$$

wherein, $\rho_{2,i}^{mask}$ corresponds to a service quality level $U_k$ expressed as:

$$U_i(\mu_{2,i}(t)) = PSNR_i(t) = \beta_i \log_2(\mu_{2,i}(t));$$

wherein, $\Phi_0(N(t_k))$ is given by $$\Phi(N(t_k)) = V\left[\sum_{i \in \Omega_A}\left(\sum_{b \in B} \sum_{n_1=1}^{N_1(t_k)} \frac{y_{1,ib}(t) \rho_{1,ib}^{n_1}(t) P_{1,ib}^{n_1}(t)}{P_{1,i}^{max}} + \frac{P_{1,i}^l(t)}{P_{1,max}^l}\right) - \sum_{i \in \Omega_B} \sum_{b \in B} \frac{y_{2,bi}(t) \beta_i \log_2(\mu_{2,i}(t))}{U_i^{max}}\right] - \sum_{b \in B} \sum_{i \in \Omega_A} \sum_{n_1=1}^{N_1(t_k)} Q_{1,i}(t) y_{1,ib}(t) \rho_{1,ib}^{n_1}(t) R_{1,ib}^{n_1}(t) \tau - \sum_{b \in B} \sum_{i \in \Omega_b} \sum_{n_2=1}^{N_2(t_k)} Q_{2,i}(t) y_{2,bi}(t) \rho_{2,bi}^{n_2}(t) R_{2,bi}^{n_2}(t) \tau - \sum_{i \in \Omega_A} Q_{1,i}(t) f_{1,i}(t) L_i^{-1} \tau - \sum_{i \in \Omega_B} Q_{2,i}(t) \mu_{2,i}(t).$$

7. A non-transitory computer-readable storage medium, wherein
a computer program is stored in the computer-readable storage medium, and when the computer program is executed by a processor, the processor executes the following steps:
step 1: obtaining network data volumes of a first service and a second service, and storing the network data volumes in a queue $Q_1$ and a queue $Q_2$, respectively;
step 2: obtaining a status of the queue $Q_1$ and a status of the queue $Q_2$ at the time t, respectively;
step 3: computing the sub-channel slices $N_1$ ($t_k$) and $N_2$ ($t_k$);
step 4: computing the local CPU speed scaling $f_1$ (t) and the user association $y_1(t)$ of service 1;
step 5: computing the sub-carrier assignment $\rho_1(t)$ and the power allocation $P_1(t)$ of service 1;
step 6: computing the user association $y_2(t)$, the video quality decision $\mu_2(t)$, and the sub-carrier assignment $\rho_2(t)$ of service 2;
step 7: updating the status of the queue $Q_1$ and the status of the queue $Q_2$; letting t=t+1, and if t is less than a total time, then executing step 2 again;
step 8: setting h=0 and an algorithm accuracy ε>0;
step 9: based on a user association $Y_0(t)=(y_1(t),y_2(t))$, a power allocation $P_1^0(t)$ and a video quality decision $\mu_2^0(t)$, assigning a sub-carrier assignment $\rho_1^0(t)$ according to step 5, and assigning a sub-carrier assignment $\rho_2^0(t)$ according to step 6;
step 10: computing $\Phi_0(N(t_k))$ based on $f_1(t)$, $P_1^0(t)$, $\mu_2^0(t)$, $\rho^0(t)$, and $Y_0(t)$;
step 11: updating h=h+1;
step 12: based on $\rho^{h-1}(t)$ and $P_1^{h-1}(t)(\mu_2^{h-1}(t))$, associating a mobile device with a user association $Y_h(t)=(y_1^h(t), y_2^h(t))$;
step 13: based on a user association $y_1^h(t)$, obtaining a power allocation $P_1^h(t)$ and a sub-carrier assignment $\rho_1^h(t)$ according to step 5;
step 14: based on $y_2^h(t)$ and $\rho_2^{h-2}(t)$, obtaining a video quality decision $\mu_2^h(t)$ according to step 6;
step 15: based on $y_2^h(t)$ and $\mu_2^{h-1}(t)$, assigning a sub-carrier assignment $\rho_2^h(t)$ according to step 6;
step 16: based on $f_1(t)$, $P_1^h(t)$, $\rho^h(t)=(\rho_1^h(t), \rho_2^h(t))$, and $Y_h(t)$, computing $\Phi_h(N(t_k))$ according to step 10, if $\Phi_h(N(t_k))-\Phi_{h-1}(N(t_k))<ε$, then obtaining the optimal CPU speed scaling, the optimal user association, the optimal sub-carrier assignment, the optimal power allocation, the optimal video quality decision, and the optimal sub-channel allocation; and if $\Phi_h(N(t_k))-\Phi_{h-1}(N(t_k))\geq ε$, executing step 12 again.

8. A system for a joint optimization of a resource allocation for implementing a method for a joint optimization of a resource allocation, wherein the method comprises:
step 1: obtaining network data volumes of a first service and a second service, and storing the network data volumes in a queue $Q_1$ and a queue $Q_2$, respectively;
step 2: obtaining a status of the queue $Q_1$ and a status of the queue $Q_2$ at the time t, respectively;
step 3: computing the sub-channel slices $N_1$ ($t_k$) and $N_2$ ($t_k$);
step 4: computing the local CPU speed scaling $f_1$ (t) and the user association $y_1(t)$ of service 1;
step 5: computing the sub-carrier assignment $\rho_1(t)$ and the power allocation $P_1(t)$ of service 1;
step 6: computing the user association $y_2(t)$, the video quality decision $\mu_2(t)$, and the sub-carrier assignment $\rho_2(t)$ of service 2;
step 7: updating the status of the queue $Q_1$ and the status of the queue $Q_2$; letting t=t+1, and if t is less than a total time, then executing step 2 again;
step 8: setting h=0 and an algorithm accuracy ε>0;
step 9: based on a user association $Y_0(t)=(y_1(t),y_2(t))$, a power allocation $P_1^0(t)$ and a video quality decision $\mu_2^0(t)$, assigning a sub-carrier assignment $\rho_1^0(t)$ according to step 5, and assigning a sub-carrier assignment $\rho_2^0(t)$ according to step 6;
step 10: computing $\Phi_0(N(t_k))$ based on $f_1(t)$, $P_1^0(t)$, $\mu_2^0(t)$, $\rho^0(t)$, and $Y_0(t)$;

step 11: updating h=h+1;

step 12: based on $\rho^{h-1}(t)$ and $P_1^{h-1}(t)(\mu_2^{h-1}(t))$, associating a mobile device with a user association $Y_h(t)=(y_1^h(t), y_2^h(t))$;

step 13: based on a user association $y_1^h(t)$, obtaining a power allocation $P_1^h(t)$ and a sub-carrier assignment $\rho_1^h(t)$ according to step 5;

step 14: based on $y_2^h(t)$ and $\rho_2^{h-2}(t)$, obtaining a video quality decision $\mu_2^h(t)$ according to step 6;

step 15: based on $y_2^h(t)$ and $\mu_2^{h-1}(t)$, assigning a sub-carrier assignment $\rho_2^h(t)$ according to step 6;

step 16: based on $f_1(t)$, $P_1^h(t)$, $\rho^h(t)=(\rho_1^h(t), \rho_2^h(t))$, and $Y_h(t)$, computing $\Phi_h(N(t_k))$ according to step 10, if $\Phi_h(N(t_k))-\Phi_{h-1}(N(t_k))<\varepsilon$, then obtaining the optimal CPU speed scaling, the optimal user association, the optimal sub-carrier assignment, the optimal power allocation, the optimal video quality decision, and the optimal sub-channel allocation; and if $\Phi_h(N(t_k))-\Phi_{h-1}(N(t_k))\geq\varepsilon$, executing step 12 again;

wherein the system further comprises:

a data acquisition module, configured for obtaining the network data volumes of the first service and the second service, and obtaining the queue statuses at the time t;

a data computation module, configured for computing the sub-channel slices, computing the local CPU speed scaling, the user association, the sub-carrier assignment, and the power allocation of the first service, computing the user association, the video quality decision, and the sub-carrier assignment of the second service, and obtaining the initial sub-carrier assignment and the initial power allocation;

a data processing module, configured for obtaining the user association, obtaining the power allocation and the sub-carrier assignment of the first service, obtaining the video quality decision, obtaining the sub-carrier assignment of the second service, and obtaining the optimal data transmission rate and the user association to obtain the data rate allocation and the user association; and a data result output module, configured for obtaining the optimal CPU speed scaling, the optimal user association, the optimal sub-carrier assignment, the optimal power allocation, the optimal video quality decision and the optimal sub-channel allocation.

9. A mobile edge computing system for implementing the method according to claim 1.

10. The system according to claim 8, wherein the local CPU speed scaling in step 4 is expressed as:

$$f_{1,i}^* = \min\left\{f_{1,i}^{max}, \sqrt{\frac{Q_{1,i}(t)\tau P_{1,mask}^i}{3Vk_iL_i}}\right\};$$

wherein, $0 \leq f_{1,i}(t) \leq f_{1,i}^{max}$, $\forall i \in \Omega_A$, t, $f_{1,i}^{max}$ is a maximum CPU clock speed of the mobile device i for the first service, $\tau$ is a time slot length, $P_{1,mask}^i$ denotes a maximum transmit power of the mobile device i for the first service, $L_i$ denotes a processing density of the mobile device i, in CPU cycles/bit, V is a control parameter, and $k_i$ is an effective switched capacitance of the mobile device i.

11. The system according to claim 8, wherein the user association in step 4 is expressed as:

$$y_{1,ib}(t) = \begin{cases} 1, & b = \arg\min_{b \in B}\{VP_{1,ib}^Z(t) - Q_{1,i}(t)R_{1,ib}^Z(t)\tau\}, \\ 0, & \text{otherwise} \end{cases};$$

wherein, $y_{1,ib}(t) \in \{0,1\}$, $\forall 1, b, t$, $\Sigma_{b \in B} y_{1,ib}(t)=1$, $\forall i, b, t$, wherein $\mathcal{B}$ is a number of edge servers, $P_{1,ib}^Z(t)$ and $P_{1,ib}^Z(t)$ are a transmit power from the mobile device i to an edge server b in a slot t and a transmit rate from the mobile device i to the edge server b in the slot t, respectively.

12. The system according to claim 8, wherein the sub-carrier assignment in step 5 is expressed as:

$$\rho_{1,ib}^{n_1*}(t) = \begin{cases} 1, & \text{if } n_1 = \arg\min \omega_{2,ib}^{n_1}(t) \& \omega_{1,ib}^{n_1}(r) < 0, \\ 0, & \text{otherwise} \end{cases};$$

wherein, $\omega_{1,ib}^{n_1}(t)$ is a weight value, $\Sigma_{b \in B} \Sigma_{i \in \Omega_A(b)} \rho_{1,ib}^{n_1}(t) \leq 1$, $\forall n_1, b, t$, $$\omega_{1,ib}^{n_1}(t) = \nabla f_i^T(v^m(t))\log(P_{1,ib}^{n_1*}) - \frac{VP_{1,ib}^{n_1}(t)}{P_{1,i}^{mask}},$$

y(t) is a parameter related to the sub-carrier assignment $\rho_1(t)$, m is an index of iteration, and f(•) is a Taylor expansion with respect to v(t).

13. The system according to claim 8, wherein the power allocation in step 5 is expressed as:

$$P_{1,ib}^{n_1*}(T) = \frac{S_{i,b}^{n_1*}(t)}{\rho_{1,ib}^{n_1}(t)} = \left[\sum_{c \in Bc \neq b}\frac{\frac{\partial f_i(v^m(t))}{\partial v_{ib}^{n_1}(t)}}{\frac{\tau Q_{1,i}(t)\rho^{n_1}(t)q_1^{n_1}(t)}{(\Sigma_{l \neq c}\Sigma_{j \in \Omega_A(l)}\rho_{1,jl}^{n_1}(t)P_{1,jl}^{n_1}(t)g_{1,jc}^{n_1}(t)+\sigma_i^2(t))\ln 2} + \frac{VP_{1,ib}^{n_1}(t)}{P_{1,i}^{mask}} - \rho_{1,ib}^{n_1}(t)\alpha_i(t)}\right]^+;$$

wherein, $\Sigma_{b \in B}\Sigma_{n_1=1}^{N_1(t_k)}\rho_{1,ib}^{n_1}(t)P_{1,ib}^{n_1}(t) \leq P_{1,i}^{max}$, $\forall i \in \Omega_A(b)$, b, t, $g_{1,ic}^{n_1}(t)$ is a channel gain from the mobile device i to an edge server c in a slot t, $\sigma(t)$ is a noise power, $\Omega_A$ is a set of mobile devices.

14. The system according to claim 8, wherein the video quality decision in step 6 is expressed as:

$$\mu_{2,i}^*(t) = \min\left\{\frac{\beta_i V}{U_i^{max}\ln 2 Q_{2,i}(t)}, \mu_{2,i}^{mask}\right\};$$

wherein, $\mu_{2,i}^{mask}$ corresponds to a service quality level $U_k$ expressed as:

$U_i(\mu_{2,i}(t)) = PSNR_i(t) = \beta_i \log_2(\mu_{2,i}(t))$;

wherein, $\Phi_0(N(t_k))$ is given by $$\Phi_0(N(t_k)) = V\left[\sum_{i\in\Omega_A}\left(\sum_{b\in B}\sum_{n_1=1}^{N_1(f_k)} \frac{y_{1,ib}(t)\rho_{1,ib}^{n_1}(t)P_{1,ib}^{n_1}(t)}{P_{1,i}^{max}} + \frac{P_{1,i}^l(t)}{P_{1,max}^l}\right) - \right.$$

$$\left. \sum_{i\in\Omega_B}\sum_{b\in B}\frac{y_{2,bi}(t)\beta_l\log_2(\mu_{2,i}(t))}{U_i^{max}}\right] -$$

$$\sum_{b\in B}\sum_{i\in\Omega_A}\sum_{n_1=1}^{N_1(f_k)} Q_{1,i}(t)y_{1,ib}(t)\rho_{1,ib}^{n_1}(t)R_{1,ib}^{n_1}(t)\tau -$$

$$\sum_{b\in B}\sum_{i\in\Omega_b}\sum_{n_2=1}^{N_2(f_k)} Q_{2,i}(t)y_{2,bi}(t)\rho_{2,bi}^{n_2}(t)R_{2,bi}^{n_2}(t)\tau -$$

$$\sum_{i\in\Omega_A} Q_{1,i}(t)f_{1,i}(t)L_i^{-1}\tau - \sum_{i\in\Omega_B} Q_{2,i}(t)\mu_{2,i}(t).$$

15. The mobile edge computing system according to claim 9, wherein the local CPU speed scaling in step 4 is expressed as:

$$f_{1,i}^* = \min\left\{f_{1,i}^{max}, \sqrt{\frac{Q_{1,i}(t)\tau P_{1,mask}^l}{3Vk_iL_i}}\right\};$$

wherein, $0\le f_{1,i}(t)\le f_{1,i}^{max}$, $\forall i\in\Omega_A$, t, $f_{1,i}^{max}$ is a maximum CPU clock speed of the mobile device i for the first service, $\tau$ is a time slot length, $P_{1,mask}^l$ denotes a maximum transmit power of the mobile device i for the first service, $L_i$ denotes a processing density of the mobile device i, in CPU cycles/bit, V is a control parameter, and $k_i$ is an effective switched capacitance of the mobile device i.

16. The mobile edge computing system according to claim 9, wherein the user association in step 4 is expressed as:

$$y_{1,ib}(t) = \begin{cases} 1, & b = \arg\min_{b\in B}\{VP_{1,ib}^Z(t) - Q_{1,i}(t)R_{1,ib}^Z(t)\tau\}, \\ 0, & \text{otherwise} \end{cases};$$

wherein, $y_{1,ib}(t)\in\{0,1\}$, $\forall 1, b, t$, $\Sigma_{b\in B} y_{1,ib}(t)=1$, $\forall i, b, t$, wherein $\mathcal{B}$ is a number of edge servers, $P_{1,ib}^Z(t)$ and $P_{1,ib}^Z(t)$ are a transmit power from the mobile device i to an edge server b in a slot t and a transmit rate from the mobile device i to the edge server b in the slot t, respectively.

17. The mobile edge computing system according to claim 9, wherein the sub-carrier assignment in step 5 is expressed as:

$$\rho_{1,ib}^{n_1*}(t) = \begin{cases} 1, & \text{if } n_1 = \arg\min_{\tilde{n}_1} \omega_{1,ib}^{\tilde{n}_1}(t) \,\&\, \omega_{1,ib}^{n_1}(r) < 0, \\ 0, & \text{otherwise} \end{cases};$$

wherein, $\omega_{1,ib}^{n_1}(t)$ is a weight value, $\Sigma_{b\in B}\Sigma_{i\in\Omega_A(b)}\rho_{1,ib}^{n_1}(t)\le 1$, $\forall n_1, b, t$, $$\omega_{1,ib}^{n_1}(t) = \nabla f_i^T(v^m(t))\log(P_{1,ib}^{n_1*}(t)) - \frac{VP_{1,ib}^{n_1*}(t)}{P_{1,i}^{mask}},$$

v(t) is a parameter related to the sub-carrier assignment $\rho_1(t)$, m is an index of iteration, and f(•) is a Taylor expansion with respect to v(t).

* * * * *